(12) United States Patent
Anemikos et al.

(10) Patent No.: US 8,176,323 B2
(45) Date of Patent: May 8, 2012

(54) RADIO FREQUENCY IDENTIFICATION (RFID) BASED AUTHENTICATION METHODOLOGY USING STANDARD AND PRIVATE FREQUENCY RFID TAGS

(75) Inventors: Theodoros Anemikos, Milton, VT (US); Shawn P. Fetterolf, Cornwall, VT (US); Adam J. McPadden, Underhill, VT (US)

(73) Assignee: International Business Machines Corporation, Armonk, NY (US)

(*) Notice: Subject to any disclaimer, the term of this patent is extended or adjusted under 35 U.S.C. 154(b) by 900 days.

(21) Appl. No.: 12/171,621

(22) Filed: Jul. 11, 2008

(65) Prior Publication Data
US 2010/0011212 A1    Jan. 14, 2010

(51) Int. Cl.
*H04L 29/06* (2006.01)
(52) U.S. Cl. .................................. 713/168; 380/270
(58) Field of Classification Search .................. 713/168, 713/171, 185; 380/270, 277; 726/9
See application file for complete search history.

(56) References Cited

U.S. PATENT DOCUMENTS

| | | | |
|---|---|---|---|
| 6,745,008 | B1 | 6/2004 | Carrender et al. |
| 6,842,106 | B2* | 1/2005 | Hughes et al. ............... 340/5.8 |
| 6,860,422 | B2* | 3/2005 | Hull et al. ..................... 235/376 |
| 7,248,165 | B2 | 7/2007 | Collins et al. |
| 7,920,096 | B2* | 4/2011 | Fogg et al. ............ 343/700 MS |
| 2006/0294388 | A1 | 12/2006 | Abraham et al. |
| 2007/0057768 | A1* | 3/2007 | Zeng et al. ................... 340/10.1 |
| 2007/0205864 | A1 | 9/2007 | Mutti et al. |
| 2007/0206797 | A1* | 9/2007 | Chan et al. .................... 380/270 |
| 2008/0022101 | A1* | 1/2008 | Sung et al. .................... 713/171 |
| 2008/0290994 | A1* | 11/2008 | Bruns et al. .................. 340/10.1 |
| 2009/0096580 | A1* | 4/2009 | Paananen .................... 340/10.1 |
| 2010/0073147 | A1* | 3/2010 | Guajardo Merchan et al. ........................ 340/10.51 |

FOREIGN PATENT DOCUMENTS
WO    WO 2006/037202 A1    4/2006

OTHER PUBLICATIONS

"Securing the Pharmaceutical Supply chain with RFID & PKI." RFID an Public-key,Infrastructure (PKI) Technologies, www.ti.com/rfid/docs/manuals/whtPapers/wp-RFID_and_PKI.pdf.
"Ntru vp1," www.ntru.com/downloads/news/VPNtru/pdf.

(Continued)

*Primary Examiner* — Samson Lemma
(74) *Attorney, Agent, or Firm* — Gibb I.P. Law Firm, LLC

(57) ABSTRACT

Disclosed is a self-contained hardware-based authentication system that incorporates different authentication protocols for access to soft and/or hard assets with different security levels. The system embodiments include the use of a RFID device that comprises dual RFID tags operating under different frequencies. Specifically, one RFID tag operates on a public frequency and, when activated, transmits an identifier encrypted using a public key. The other RFID tag operates on a private frequency and, when activated, transmits a private key that can be used to decrypt the encrypted identifier. Upon receipt by a processor (e.g., a local processor or security server) of a request for access to a specific asset, a security level for the specific asset is determined. Then, depending upon the particular security level (e.g., low, medium or high) different authentication protocols are instituted using the RFID device. Also disclosed are embodiments of an associated authentication methodology.

24 Claims, 3 Drawing Sheets

OTHER PUBLICATIONS

D12.3: A Holistic Privacy Framework for RFID Applications; Future, www.fidis.net/.../deliverables/hightechid/d123-a-holistic-privacy-framework-for-rfid-applications/doc/33/.

"NEC Develops Worlds' First Multi=Frequency,Multi=Protocol RFID," goliath.ecnext.com/coms2/gi_0199-6925967/NEC-Develops-World-s-First.html.

"Multi=Tag Radio Frequency Identification Systems," ieeexplore.ieee.org/iel5/10364/32967/01544405.pdf.

* cited by examiner

RADIO FREQUENCY IDENTIFICATION (RFID) BASED AUTHENTICATION METHODOLOGY USING STANDARD AND PRIVATE FREQUENCY RFID TAGS

BACKGROUND

1. Field of the Invention

The embodiments of the invention generally relate to radio frequency identification RFID) authentication systems and, more specifically, to an improved RFID authentication system.

2. Description of the Related Art

Entities, such as governments, corporations, business, etc., often have secured soft and hard assets (i.e., secured electronic and physical property, respectively). Secured hard assets can comprise, for example, secured facilities, secured areas with a secured facility, secured equipment (e.g., file cabinets, computers, etc.) within a secured area, etc. Secured soft assets can comprise secured electronic data, for example, electronic folders, files, documents, programs, images, videos, etc. The security levels for such soft and hard assets may further vary (e.g., from low to high). Current user authentication methodologies for allowing access to secured assets revolve around manual user authentication protocols and identification (ID) badges or cards. Some ID badges (or cards) use radio frequency identification (RFID) tags (i.e., RFID transponders) for user authentication.

For example, a typical RFID authentication system comprises a RFID tag (i.e., an RFID transponder), a RFID reader (i.e., a RFID interrogator), and a host device (e.g., a computer). The RFID tag comprises an integrated circuit device and, particularly, a memory device programmed with authentication (i.e., identifying) information and an antenna, for transmitting the authentication information, when activated. The RFID reader also comprises an antenna. The RFID reader antenna transmits a radio frequency signal to activate and, thereby initiate transmission of the authentication information by the RFID tag antenna. The RFID reader antenna further receives (i.e., reads) the transmitted authentication information and communicates the read authentication information to the host device. The host device then authenticates the user (i.e., verifies the identity of the user) that is requesting assess to secured soft or hard assets, based on the received authentication information. Unfortunately, such RFID authentication systems do not allow for different levels of user authentication protocols based on different security-levels associated with the assets. Therefore, there is a need in the art for a self-contained, security-level based and hard-ware based secure access methodology to soft and hard assets.

SUMMARY

In view of the foregoing, disclosed herein are embodiments of a self-contained hardware-based authentication system that incorporates different authentication protocols for access to soft and/or hard assets with different security levels. The system embodiments include the use of a RFID device (e.g., a badge or card) that comprises dual RFID tags operating under different frequencies. Specifically, one RFID tag operates on a public frequency and, when activated, transmits an identifier (e.g., a passphrase, passcode, password, etc.) encrypted using a public key. The other RFID tag operates on a private frequency and, when activated, transmits a private key that can be used to decrypt the encrypted identifier. Upon receipt by a processor (e.g., a local processor or security server) of a request for access to a specific asset, a security level for the specific asset is determined. Then, depending upon the particular security level (e.g., low, medium or high) different authentication protocols are instituted using the RFID device. Also disclosed are embodiments of an associated authentication methodology.

More particularly, disclosed herein are embodiments of a RFID authentication system. The authentication system can comprise multiple RFID devices (e.g., ID badges or ID cards). Each RFID device can be associated with a different user of the system and can be embedded with dual RFID tags. Specifically, each RFID device can comprise a first RFID tag. The first RFID tag can comprise a first integrated circuit device that stores an encrypted identifier for a specific user and, more particularly, an encrypted identifier that was encrypted with a public key. The first RFID tag can also comprise a first RFID tag antenna that is connected to the first integrated circuit device and that transmits the encrypted identifier, when activated. The RFID device can also comprise a second RFID tag. The second RFID tag can comprise a second integrated circuit device that stores a private key that can be used to decrypt the encrypted identifier stored in the first integrated circuit device. The second RFID tag can also comprise a second RFID tag antenna that is connected to the second integrated circuit device and that transmits the private key, when activated. On each RFID device, the first RFID tag antenna can operate at a first radio frequency and the second RFID tag antenna can operate at a second radio frequency that is different from the first radio frequency. More specifically, the second radio frequency can have a more restricted use relative to the first radio frequency. That is, the first radio frequency can be a public radio frequency and the second radio frequency can be a private radio frequency.

The authentication system can further comprise at least one RFID reader. Specifically, a RFID reader can be associated with one or more assets. For example, in the case of physical assets (e.g., a facility, building, piece of equipment, etc.), one RFID reader may be associated with one asset. However, in the case of soft assets, one RFID reader may be associated with a computer that stores or has access to multiple soft assets. Each RFID reader can comprise a first RFID reader antenna for activating and receiving transmitted data from the first RFID tag antenna on a RFID device and a second RFID reader antenna for activating and receiving transmitted data from the second RFID tag antenna on a RFID device. The authentication system can further comprise a single processor (i.e., a server) or multiple local processors each capable of receiving a request by a specific user for access to a specific asset, of determining the security level associated with that specific asset and of authenticating the specific user, according to the appropriate security-level based protocol, using the different RFID tags on the specific user's RFID device.

Also disclosed herein are embodiments of an associated radio frequency identification (RFID) authentication method. The method embodiments can comprise providing each specific user with a RFID device, such as the dual-RFID tag RFID device described in detail above. Then, when a request by that specific user for access to a specific asset is received, a determination is made as to the security level associated with the specific asset. Next, depending upon the security level, at least one level of user authentication is performed using the RFID device. Finally, also disclosed is a computer program product for performing radio frequency identification (RFID) authentication. This computer program product can comprise a computer usable medium having computer usable program code embodied therewith. The computer program code can comprise computer usable program code that is configured to perform the above-described RFID authentication method.

BRIEF DESCRIPTION OF THE SEVERAL VIEWS OF THE DRAWINGS

The embodiments of the invention will be better understood from the following detailed description with reference to the drawings, which are not necessarily drawing to scale and in which.

DETAILED DESCRIPTION

The embodiments of the invention and the various features and advantageous details thereof are explained more fully with reference to the non-limiting embodiments that are illustrated in the accompanying drawings and detailed in the following description.

As mentioned above, entities, such as governments, corporations, business, etc., often have secured soft and hard assets (i.e., secured electronic and physical property, respectively). Secured hard assets can comprise, for example, secured facilities, secured areas with a secured facility, secured equipment (e.g., file cabinets, computers, etc.) within a secured area, etc. Secured soft assets can comprise secured electronic data, for example, electronic folders, files, documents, programs, images, videos, etc. The security levels for such soft and hard assets may further vary (e.g., from low to high). Current user authentication methodologies for allowing access to secured assets revolve around manual user authentication protocols and identification (ID) badges or cards. Some ID badges (or cards) use radio frequency identification (RFID) tags (i.e., RFID transponders) for user authentication.

For example, a typical RFID authentication system comprises a RFID tag (i.e., an RFID transponder), a RFID reader (i.e., a RFID interrogator), and a host device (e.g., a computer). The RFID tag comprises an integrated circuit device and, particularly, a memory device programmed with authentication (i.e., identifying) information and an antenna, for transmitting the authentication information, when activated. The RFID reader also comprises an antenna. The RFID reader antenna transmits a radio frequency signal to activate and, thereby initiate transmission of the authentication information by the RFID tag antenna. The RFID reader antenna further receives (i.e., reads) the transmitted authentication information and communicates the read authentication information to the host device. The host device then authenticates the user (i.e., verifies the identity of the user) that is requesting assess to secured soft or hard assets, based on the received authentication information. Unfortunately, such RFID authentication systems do not allow for different levels of user authentication protocols based on different security-levels associated with the assets. Therefore, there is a need in the art for a self-contained, security-level based and hard-ware based secure access methodology to soft and hard assets.

Figure 1:
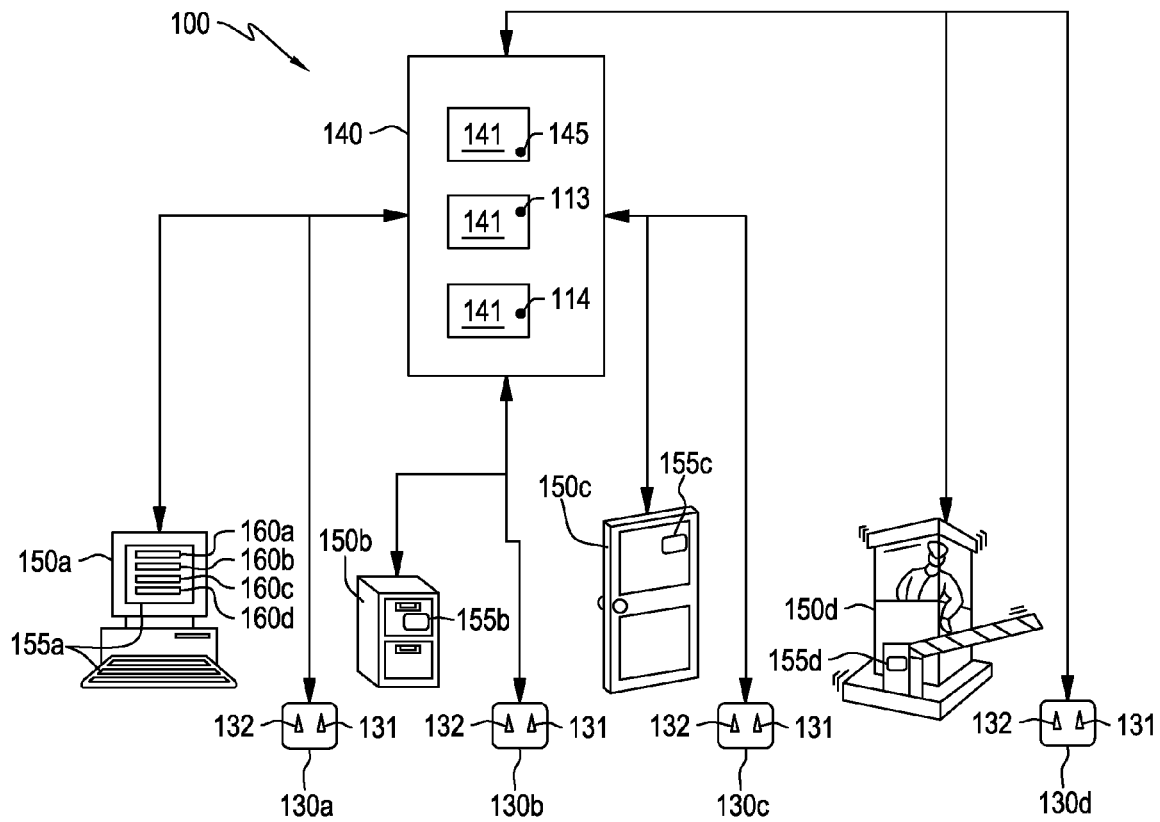
FIG. 1 is a diagram illustrating an embodiment of the authentication system of the present invention.
Figure 1:
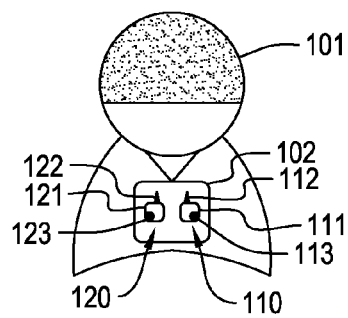
Figure 2:
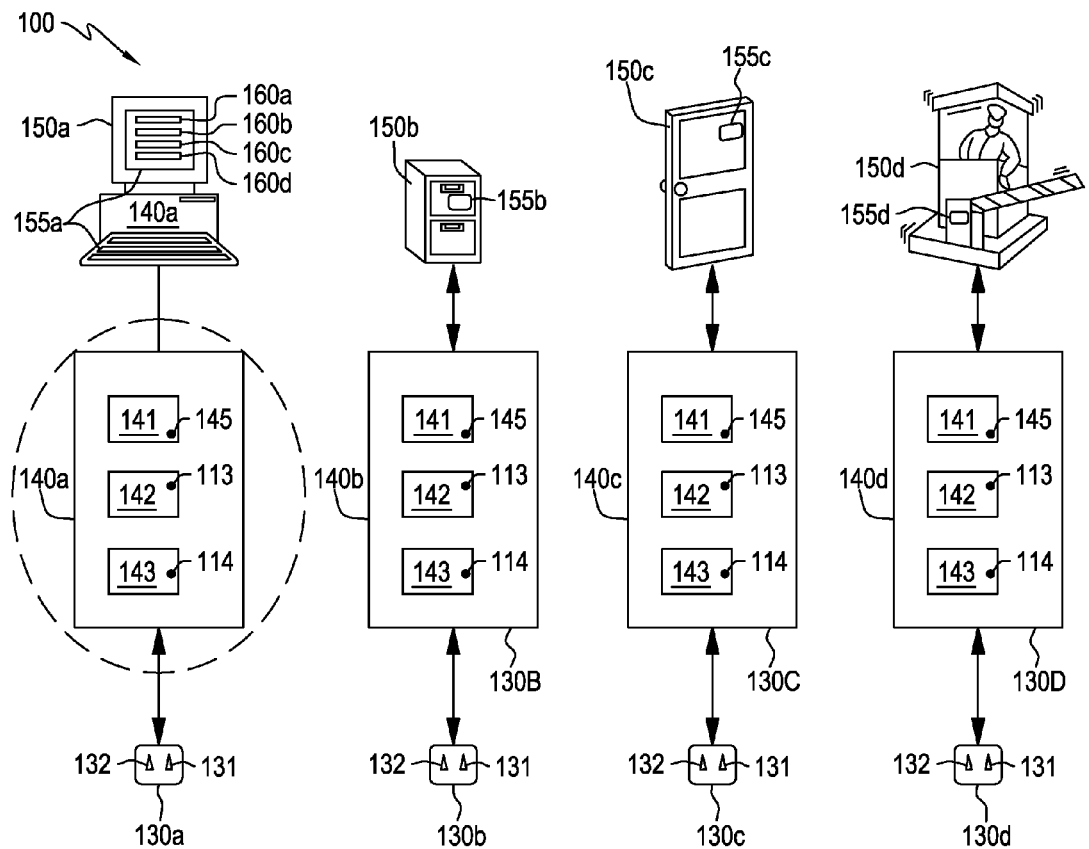
FIG. 2 is a diagram illustrating another embodiment of the authentication system of the present invention.
Figure 2:
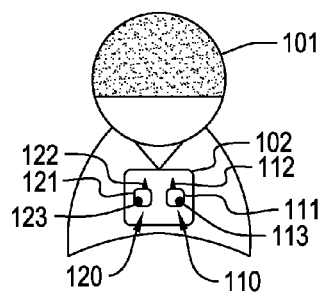

More particularly, referring to FIGS. 1 and 2, disclosed herein are embodiments of a RFID authentication system 100. The authentication system 100 can comprise multiple RFID devices (e.g., ID badges or ID cards). Each RFID device 102 can be associated with a different user 101 of the system 100 and can be embedded with dual RFID tags 110, 120.

Specifically, each RFID device 102 can comprise a first RFID tag 110. The first RFID tag 110 can comprise a first integrated circuit device 111 (e.g., a first memory device) that stores (i.e., that is programmed with) an encrypted identifier 113 for a specific user 101. The encrypted identifier 113 can comprise an identifier (e.g., a passphrase, passcode, password, series of letters and/or numbers, etc.) which has been previously encrypted using a public key. This identifier can be selected by or assigned to the specific user 101. Identifiers with greater lengths can provide enhanced security. The first RFID tag 110 can also comprise a first RFID tag antenna 112 that is connected to the first integrated circuit device 111 and that transmits the encrypted identifier 113, when activated.

The RFID device 102 can also comprise a second RFID tag 120. The second RFID tag 120 can comprise a second integrated circuit device 121 (e.g., a second memory device) that stores (i.e., that is programmed with) a private key 123 and, more particularly, a private key 123 that can be used to decrypt the encrypted identifier 113. The second RFID tag 120 can also comprise a second RFID tag antenna 122 that is connected to the second integrated circuit device 121 and that transmits the private key 123, when activated.

On each RFID device 102, the first RFID tag antenna 112 can operate at a first radio frequency and the second RFID tag antenna 122 can operate at a second radio frequency that is different from the first radio frequency. More specifically, the second radio frequency can have a more restricted use relative to the first radio frequency. For example, the first radio frequency of the first RFID tag antenna 112 can be a public radio frequency and the second radio frequency of the second RFID tag antenna 122 can be a private radio frequency (i.e., a secured or proprietary radio frequency).

Those skilled in the art will recognize that in conventional public-key cryptography two related keys (i.e., a public key and a private key) are generated mathematically. Information that is encrypted with a public key can only be read (i.e., decrypted) with the related private key. Generally, such keys are used as follows. A first user will generate both the public key and the related private key. The first user will disseminate the public key and keep the private key private. A second user will use the public key to encrypt data (e.g., a message) and will transmit the encrypted data to the first user. The first user will then decrypt the message using the private key.

As mentioned above, the RFID authentication system 100 of the present invention uses public and private keys; however, the system 100 differs from conventional public-key cryptography in that the RFID device 102 of the present invention is configured to transmit public key encrypted information 113 over a public frequency and further to transmit the private key 123, which is required to decrypt the encrypted information 113, over a private frequency. The unique RFID device 102 of the present invention can transmit both public key encrypted information 113 and the related private key 123 in such a manner as to provide multiple levels of user authentication for allowing access to soft and hard assets (i.e., electronic and physical property) having different security levels (e.g., low, medium and high security levels).

Specifically, the authentication system 100 can further comprise at least one RFID reader (e.g., 130a-d). An RFID reader can be associated with one or more assets. That is, in the case of secured hard assets (i.e., secured physical property), one RFID reader may be associated with only one asset. For example, see RFID readers 130a and 130b associated with a secured piece of equipment, such as a secured computer 150a or file cabinet 150b; see RFID reader 130c associated with a secured area, such as a secured door 150c to a building or room within a building; and see RFID reader 130d associated with a secured facility 150d. However, in the case of soft assets (i.e., secured electronic property, such as electronic data files, documents, folders, images, videos, programs, etc.), one RFID reader 130a may be associated with a computer 150a that stores or has access to (e.g., via a local or global network) multiple soft assets 160a-d. Each RFID reader 130a-d can comprise a first RFID reader antenna 131 for activating and receiving transmitted data from the first RFID tag antenna 112 on a RFID device 102 and a second RFID reader antenna 132 for activating and receiving transmitted data from the second RFID tag antenna 122 on a RFID device 102.

The authentication system 100 can further comprise at least one processor. For example, as illustrated in FIG. 1, a single processor 140 (i.e., a server) can be in communication with (e.g., over a wired or wireless network) and in control of each of the RFID readers 130a-d. This single processor 140 can further be in communication with each of the assets 150a-d and in control of denying and allowing access to hard assets 150a-d and, in the case of the computer 150a, also denying and allowing access to soft assets 160a-d.

Alternatively, as illustrated in FIG. 2, for any given RFID reader (e.g., 130a-d), a corresponding local processor 140a-d may be in communication with and in control of that given RFID reader. Each local processor can further be an integral component of an asset (e.g., see processor 140a of computer 150a) or a discrete component in communication with a specific asset (e.g., see processors 140b-d associated with assets 150b-d). Each local processor 140a-d can similarly be in control of denying or allowing access to one or more specific assets. For example, processor 140a associated with computer 150a can be in control of denying and allowing access to the computer 150a, processor 140a can further be in control of denying and allowing access to any soft assets (i.e., electronic property 160a-d) contained or accessible through computer 150a. The use of local processors 140a-d has the advantage of allowing the system 100 to be portable (i.e., stand alone), as it does not require a network connection.

Each processor, whether it is a single server 140 (as illustrated in FIG. 1) or one of multiple local processors 140a-d (as illustrated in FIG. 2), can comprise three databases 141-143. The first database 141 can store the security levels 145 (e.g., low, medium or high) associated with one or more assets (e.g., with one or more hard assets 150a-d and/or soft assets 160a-d). The second database 142 can store, for each specific user (e.g., user 101) of the system 100, the encrypted identifier 113 encrypted with the public key (i.e., the same encrypted identifier 113 as should be stored in the first integrated circuit device 111 of the first RFID tag 110 on the RFID device 102). Finally, the third database 143 can store, for each specific user (e.g., user 101) of the system 100, the unencrypted identifier 114 for the specific user 101.

Each processor, whether it is a single server 140 (as illustrated in FIG. 1) or one of multiple local processors 140a-d (as illustrated in FIG. 2), is further capable of receiving a request by a specific user 101 for access to a specific asset. In the case of hard assets (i.e., secured physical property 150a-d), this request may, for example, be automatically triggered (e.g., by automatic activation of a motion or weight detection device) or manually triggered (e.g., by manual activation of an access request input device, such as pushing a door bell or turning on a computer) by the specific user 101 upon presentation before the physical asset. In the case of soft assets (i.e., secured electronic property 160a-d), this request may, for example, be triggered by an attempt to open the electronic file, document, folder, etc.

Upon receiving such a request, each processor can further determine the security level associated with the specific asset to which access is requested. Specifically, upon receiving a request by a specific user 101 for access to a specific asset, the processor can access the first database 141 to determine the security level (e.g., low, medium or high) associated with that specific asset. Then, upon determining the security level associated with the specific asset, the processor can further authenticate the specific user 101, according to the appropriate security-level based protocol, using the different RFID tags 110 and 120 on the specific user's RFID device 102.

That is, for all security levels 145 (i.e., when the security level any one of a low, medium or high security level), the processor (i.e., server 140 of FIG. 1 or one of the local processors 140a-d of FIG. 2) can perform a first level of user authentication. Specifically, the processor can cause the first RFID tag antenna 112 of the first RFID tag 110 on the user's RFID device 102 to be activated by the first RFID reader antenna 131 of the appropriate RFID reader, thereby causing the encrypted identifier 113 to be transmitted. Next, the processor can compare the encrypted identifier 113, as stored by the second database 142, and the encrypted identifier 113, as transmitted by the first RFID tag antenna 112. When the encrypted identifier 113, as stored by the second database 142, and the encrypted identifier 113, as transmitted by the first RFID tag antenna 112, are not identical (i.e., are different), then the processor can deny the specific user 101 access to any or all of the assets (i.e., can block access by the specific user 101). When the encrypted identifier 113, as stored by the second database 142, and the encrypted identifier 113, as transmitted by the first RFID tag antenna 112, are identical (i.e., are the same) and when the security level comprises a low security level, the processor can allow (i.e., grant) the specific user 101 access to the specific asset requested. For example, in the case of hard assets (i.e., secured physical property 150a-d), the processor may cause a computer 150a to boot up, may cause a file cabinet 150b or a door 150c to become unlocked, may cause a gate 150d to open, etc. In the case of soft assets (i.e., secured electronic property 160a-d), the processor may cause an electronic folder, file, document, program, image, video, etc. to open on a computer 150a.

However, when the security level is greater than a low security level (i.e., when the security level comprise a medium or high security level), the processor (i.e., server 140 of FIG. 1 or one of the local processors 140a-d of FIG. 2) can further perform a second level of user authentication. Specifically, the processor can cause the second RFID tag antenna 122 of the second RFID tag 120 on the users RFID device 102 to be activated by the second RFID reader antenna 132 of the appropriate RFID reader, thereby causing the private key 123 to be transmitted. Then, the processor can decrypt the encrypted identifier 113 with the private key 123 so as to generate a decrypted identifier for the specific user 101. Next, the processor can compare the decrypted identifier to the unencrypted identifier 114 (as stored in the third database 143). When the decrypted identifier and the unencrypted identifier 114 are not identical (i.e., are different), the processor can deny the specific user 101 access to any or all of the assets (i.e., can block access by the specific user 101). When the decrypted identifier and the unencrypted identifier 114 are identical (i.e., are the same) and when the security level comprises a medium security level, the processor can allow (i.e., grant) the specific user 101 access to the specific asset. For example, in the case of hard assets (i.e., secured physical property 150a-d), the processor may cause a computer 150a to boot up, may cause a file cabinet 150b or a door 150c to become unlocked, may cause a gate 150d to open, etc. In the case of soft assets (i.e., secured electronic property 160a-d), the processor may cause an electronic folder, file, document, program, image, video, etc. to open on a computer 150a.

However, when the security level comprises a high security level, the processor (i.e., server 140 of FIG. 1 or one of the local processors 140a-d of FIG. 2) can further perform a third level of user authentication. Specifically, the system 100 can further comprise a user interface (e.g., key board and graphical user interface (GUI) 155a of computer 150a or a keypad and display 155b-c associated with other physical assets 150b-c). Through the user interface, the processor can prompt the specific user 101 to manually enter the unencrypted identifier and can then compare the unencrypted identifier as entered by the specific user 101 with the unencrypted identifier 114 as stored by the third database 143 (which was previously determined to be the same as the decrypted identifier). When the unencrypted identifier as entered by the specific user 101 through the user interface (e.g., 155a) and the unencrypted identifier 114 as stored by the third database 143 are not identical (i.e., are different), the processor 140 can deny the specific user 101 access to any or all of the assets (i.e., can block access by the specific user 101). When the unencrypted identifier as entered by the specific user 101 through the user interface (e.g., 155a) and the unencrypted identifier 114 as stored by the third database 143 are identical, the processor 140 can allow (i.e., grant) the specific user 101 access to the specific asset. For example, in the case of hard assets (i.e., secured physical property 150a-d), the processor may cause a computer 150a to boot up, may cause a file cabinet 150b or a door 150c to become unlocked, may cause a gate 150d to open, etc. In the case of soft assets (i.e., secured electronic property 160a-d), the processor may cause an electronic folder, file, document, program, image, video, etc. to open on a computer 150a.

Figure 3:
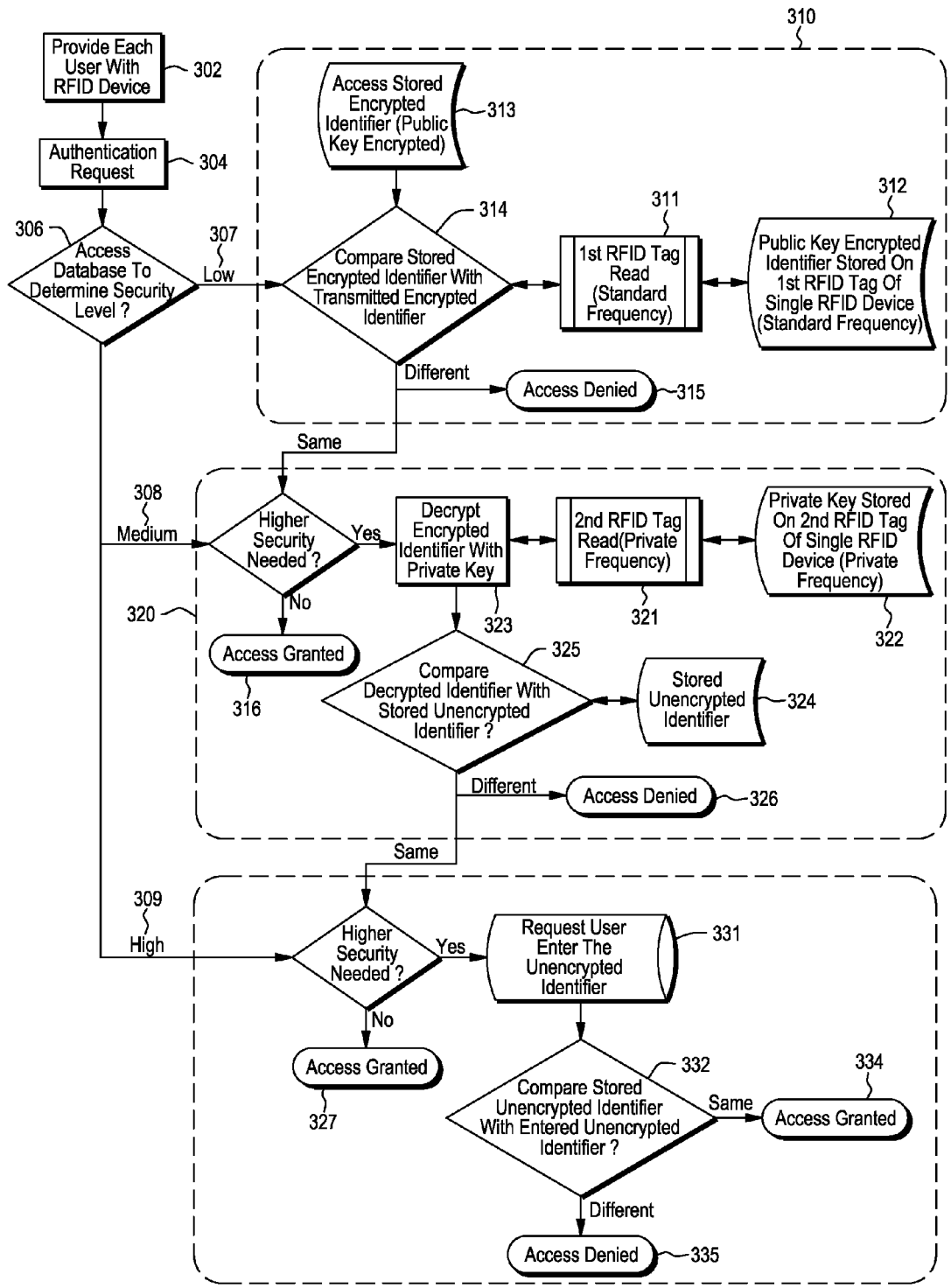
FIG. 3 is a flow diagram illustrating an embodiment of the authentication method of the present invention.

Referring to FIG. 3 in combination with FIGS. 1 and 2, also disclosed herein are embodiments of an associated radio frequency identification (RFID) authentication method. The method embodiments can comprise providing each specific user 101 with a personalized RFID device, such as the dual-RFID tag RFID device 102 described in detail above (302). Then, when a request by that specific user 101 for access to a specific asset, such as one of the hard assets 105a-d or soft assets 106a-d, is received (i.e., an authentication request) (304), a determination is made as to the security level associated with the specific asset (306). Specifically, at process 306, the security level associated with the specific asset (as low 307, medium 308 or high 309) is determined by accessing a first database 141 that stores at least the security level for that one specific asset. Next, depending upon the security level, at least one level of user authentication is performed using the RFID device 102 (310, 320, 330).

Specifically, the method embodiments comprise performing a first level of user authentication regardless of the security level (i.e., when the security level comprises any one of a low security level 307, a medium security level 308 and a high security level 309) (310). The process 310 of performing the first level of user authentication comprises causing a first RFID reader antenna 131 of an appropriate RFID reader (e.g., see RFID readers 130a-130d associated with assets 150a-d) to activate the first RFID tag antenna 112 of the first RFID tag 110 on the user's RFID device 102 in order to receive the encrypted identifier 113, as stored in the first integrated circuit 110 of the first RFID tag 110 (311-312). Then, a second database 142 that also stores the encrypted identifier 113 for the specific user 101 is accessed (313) and the encrypted identifier 113, as transmitted by the first RFID tag antenna 112, is compared with the encrypted identifier 113, as stored in the second database 142 (314). When the encrypted identifier 113, as stored by the second database 142, and the encrypted identifier 113, as transmitted by the first RFID tag antenna 112, are not identical (i.e., are different), then access by the specific user 101 to any or all of the assets is denied (315). When the encrypted identifier 113, as stored by the second database 142, and the encrypted identifier 113, as transmitted by the first RFID tag antenna 112, are identical (i.e., are the same) and when the security level comprises a low security level 307, then access by the specific user 101 to the specific asset requested is allowed (i.e., granted) (316). For example, in the case of hard assets (i.e., secured physical property 150a-d), a computer 150a may be booted up, a file cabinet 150b or a door 150c may become unlocked, a gate 150d may open, etc. In the case of soft assets (i.e., secured electronic property 160a-d), an electronic folder, file, document, program, image, video, etc. may be opened on a computer 150a.

However, when the security level is determined at process 306 to be greater than a low security level (i.e., when the security level comprises a medium 308 or high 309 security level), a second level of user authentication can be performed (320). Specifically, the process 320 of performing the second level of user authentication comprises causing a second RFID reader antenna 132 of the same RFID reader (e.g., see RFID readers 130a-d associated with assets 150a-d) to activate the second RFID tag antenna 122 of the second RFID tag 120 on the user's RFID device 102 in order to receive the private key 123, as stored on the second integrated circuit device 121 of the second RFID tag 120 (321-322). Next, the encrypted identifier 113 with the private key 123 is decrypted so as to generate a decrypted identifier for the specific user 101 (323). Then, a third database 143 that stores an unencrypted identifier 114 for the specific user 101 can be accessed (324) and the decrypted identifier as generated at process 323 can be compared to this unencrypted identifier 114 (325). When the decrypted identifier and the unencrypted identifier 114 are not identical (i.e., are different), access by the specific user 101 to any or all of the assets is denied (326). When the decrypted identifier and the unencrypted identifier 114 are identical (i.e., are the same) and when the security level comprises a medium security level 308, then access by the specific user 101 to the specific asset requested is allowed (i.e., granted) (327). For example, in the case of hard assets (i.e., secured physical property 150a-d), a computer 150a may be booted up, a file cabinet 150b or a door 150c may become unlocked, a gate 150d may open, etc. In the case of soft assets (i.e., secured electronic property 160a-d), an electronic folder, file, document, program, image, video, etc. may be opened on a computer 150a.

However, when the security level is determined at process 306 to be a high security level 309, a third level of user authentication can be performed (330). Specifically, the process 330 of performing the third level of user authentication can comprise prompting the specific user 101 to manually enter the unencrypted identifier through a user interface (331) and then comparing the unencrypted identifier as entered by the specific user 101 at process 331 with the unencrypted identifier 114 as stored by the third database 143 (which was previously determined at process 325 to be the same as the decrypted identifier) (332). When the unencrypted identifier as entered by the specific user 101 through the user interface (e.g., 155a) and the unencrypted identifier 114 as stored by the third database 143 are not identical (i.e., are different), then access by the specific user 101 to any or all of the assets is denied (334). When the unencrypted identifier as entered by the specific user 101 through the user interface (e.g., 155*a*) and the unencrypted identifier 114 as stored by the third database 143 are identical (i.e., are the same), then access by the specific user 101 to the specific asset requested is allowed (i.e., granted). For example, in the case of hard assets (i.e., secured physical property 150*a-d*), a computer 150*a* may be booted up, a file cabinet 150*b* or a door 150*c* may become unlocked, a gate 150*d* may open, etc. In the case of soft assets (i.e., secured electronic property 160*a-d*), an electronic folder, file, document, program, image, video, etc. may be opened on a computer 150*a*.

Finally, also disclosed is a computer program product for performing radio frequency identification (RFID) authentication. This computer program product can comprise a computer usable medium having computer usable program code embodied therewith. The computer program code can comprise computer usable program code that is configured to perform the above-described RFID authentication method.

The embodiments of the invention can take the form of an entirely hardware embodiment or an embodiment including both hardware and software elements. In a preferred embodiment, the method of the invention is implemented in software, which includes but is not limited to firmware, resident software, microcode, etc.

Furthermore, the method embodiments of the invention can take the form of a computer program product accessible from a computer-usable or computer-readable medium providing program code for use by or in connection with a computer or any instruction execution system. For the purposes of this description, a computer-usable or computer readable medium can be any apparatus that can comprise, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output (I/O) devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

It should be understood that the corresponding structures, materials, acts, and equivalents of all means or step plus function elements in the claims below are intended to include any structure, material, or act for performing the function in combination with other claimed elements as specifically claimed. Additionally, it should be understood that the above-description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated. Well-known components and processing techniques are omitted in the above-description so as to not unnecessarily obscure the embodiments of the invention.

Finally, it should also be understood that the terminology used in the above-description is for the purpose of describing particular embodiments only and is not intended to be limiting of the invention. For example, as used herein, the singular forms "a", "an" and "the" are intended to include the plural forms as well, unless the context clearly indicates otherwise. Furthermore, as used herein, the terms "comprises", "comprising," and/or "incorporating" when used in this specification, specify the presence of stated features, integers, steps, operations, elements, and/or components, but do not preclude the presence or addition of one or more other features, integers, steps, operations, elements, components, and/or groups thereof.

Therefore, disclosed above are embodiments of a self-contained hardware-based authentication system that incorporates different authentication protocols for access to soft and/or hard assets with different security levels. The system embodiments include the use of a RFID device (e.g., a badge or card) that comprises dual RFID tags operating under different frequencies. Specifically, one RFID tag operates on a public frequency and, when activated, transmits an identifier (e.g., a passphrase, passcode, password, etc.) encrypted using a public key. The other RFID tag operates on a private frequency and, when activated, transmits a private key that can be used to decrypt the encrypted identifier. Upon receipt by a processor (e.g., a local processor or security server) of a request for access to a specific asset, a security level for the specific asset is determined. Then, depending upon the particular security level (e.g., low, medium or high) different authentication protocols are instituted using the RFID device. Also disclosed are embodiments of an associated authentication methodology.

What is claimed is:

1. A radio frequency identification (RFID) authentication system comprising:
   a RFID device comprising:
      a first RFID tag comprising:
         a first integrated circuit device storing an encrypted identifier for a specific user, said encrypted identifier encrypted with a public key; and
         a first RFID tag antenna connected to said first integrated circuit device, said first RFID tag antenna transmitting said encrypted identifier, when activated; and
      a second RFID tag comprising:
         a second integrated circuit device storing a private key; and
         a second RFID tag antenna connected to said second integrated circuit device, said second RFID tag antenna transmitting said private key, when activated, said first RFID tag antenna operating at a first radio frequency and said second RFID tag antenna operating at a second radio frequency different from said first radio frequency and having restricted use relative to said first radio frequency; and a RFID reader comprising a first RFID reader antenna for activating said first RFID tag antenna and second RFID reader antenna for activating said second RFID tag antenna.

2. The radio frequency identification (RFID) authentication system of claim 1, further comprising a security server in communication with and controlling said RFID reader, said security server comprising a first database storing security levels associated with different assets, said security server further receiving a request, by said specific user, for access to a specific asset and accessing said first database to determine a security level associated with said specific asset.

3. The radio frequency identification (RFID) authentication system of claim 2, said security server further comprising a second database storing said encrypted identifier encrypted with said public key and said security server further performing a first level of user authentication by causing said first RFID tag antenna to be activated by said first RFID reader antenna and comparing said encrypted identifier as stored by said second database and said encrypted identifier as transmitted by said first RFID tag antenna.

4. The radio frequency identification (RFID) authentication system of claim 3, said security server further performing one of the following:
denying said specific user access to all of said assets when said encrypted identifier as stored by said second database and said encrypted identifier as transmitted by said first RFID tag antenna are not identical; and
allowing said specific user access to said specific asset, when said encrypted identifier as stored by said second database and said encrypted identifier as transmitted by said first RFID tag antenna are identical and when said security level comprises a low security level.

5. The radio frequency identification (RFID) authentication system of claim 3, said security server further comprising a third database storing an unencrypted identifier for said specific user, said security server further performing a second level of user authentication by causing said second RFID tag antenna to be activated by said second RFID reader antenna, decrypting said encrypted identifier with said private key so as to generate a decrypted identifier for said specific user, and comparing said decrypted identifier to said unencrypted identifier, when said security level is greater than said low security level.

6. The radio frequency identification (RFID) authentication system of claim 5, said security server further performing one of the following:
denying said specific user access to all of said assets, when said decrypted identifier and said unencrypted identifier are not identical; and
allowing said specific user access to said specific asset, when said decrypted identifier and said unencrypted identifier are identical and when said security level comprises a medium security level.

7. The radio frequency identification (RFID) authentication system of claim 5, further comprising a user interface, said security server further performing a third level of user authentication by prompting said specific user to enter said unencrypted identifier and comparing said unencrypted identifier as entered by said specific user through said user interface with said unencrypted identifier as stored by said third database, when said security level comprises a high security level.

8. The radio frequency identification (RFID) authentication system of claim 7, said security server further performing one of the following:
denying said specific user access to all of said assets, when said unencrypted identifier as entered by said specific user through said user interface and said unencrypted identifier as stored by said third database are not identical; and
allowing said specific user access to said specific asset, when said unencrypted identifier as entered by said specific user through said user interface and said unencrypted identifier as stored by said third database are identical.

9. A radio frequency identification (RFID) authentication method comprising:
receiving a request by a specific user for access to a specific asset, said specific user having a RFID device, said RFID device comprising:
a first RFID tag comprising:
a first integrated circuit device storing an encrypted identifier for said specific user, said encrypted identifier encrypted with a public key; and
a first RFID tag antenna connected to said first integrated circuit device, said first RFID tag antenna transmitting said encrypted identifier, when activated; and
a second RFID tag comprising:
a second integrated circuit device storing a private key; and
a second RFID tag antenna connected to said second integrated circuit device, said second RFID tag antenna transmitting said private key, when activated;
determining a security level associated with said specific asset; and
depending upon said security level, performing at least one level of user authentication using said RFID device.

10. The method of claim 9, said determining of said security level comprising accessing a first database storing said security level for said specific asset.

11. The method of claim 9, said performing of at least one level of user authentication comprising performing a first level of user authentication when said security level comprises one of a low security level, a medium security level and a high security level, said performing of said first level of user authentication comprising:
causing a first RFID reader antenna of a RFID reader to activate said first RFID tag antenna in order to receive said encrypted identifier;
accessing a second database storing said encrypted identifier for said specific user; and
comparing said encrypted identifier as transmitted by said first RFID tag antenna with said encrypted identifier as stored in said second database.

12. The method of claim 11, said performing of said first level of user authentication further comprising one of the following:
denying said specific user access to all of said assets when said encrypted identifier as stored by said second database and said encrypted identifier as transmitted by said first RFID tag antenna are not identical; and
allowing said specific user access to said specific asset, when said encrypted identifier as stored by said second database and said encrypted identifier as transmitted by said first RFID tag antenna are identical and when said security level comprises a low security level.

13. The method of claim 11, said performing of said at least one level of user authentication further comprising performing a second level of user authentication when said security level comprises one of said medium security level and said high security level, said performing of said second level of user authentication comprising:
 causing a second RFID reader antenna of said RFID reader to activate said second RFID tag antenna in order to receive said private key;
 decrypting said encrypted identifier with said private key so as to generate a decrypted identifier for said specific user;
 accessing a third database storing an unencrypted identifier for said specific user; and
 comparing said decrypted identifier to said unencrypted identifier.

14. The method of claim 13, said performing of said second level of user authentication further comprising one of the following:
 denying said specific user access to all of said assets, when said decrypted identifier and said unencrypted identifier are not identical; and
 allowing said specific user access to said specific asset, when said decrypted identifier and said unencrypted identifier are identical and when said security level comprises said medium security level.

15. The method of claim 13, said performing of at least one level of user authentication further comprising performing a third level of user authentication when said security level comprises said high security level, said performing of said third level of user authentication comprising:
 prompting said specific user to enter said unencrypted identifier through a user interface; and
 comparing said unencrypted identifier as entered through said user interface with said unencrypted identifier as stored in said third database.

16. The method of claim 15, said performing of said third level of user authentication further comprising one of the following:
 denying said specific user access to all of said assets, when said unencrypted identifier as entered by said specific user through said user interface and said unencrypted identifier as stored by said third database are not identical; and
 allowing said specific user access to said specific asset, when said unencrypted identifier as entered by said specific user through said user interface and said unencrypted identifier as stored by said third database are identical.

17. A non-transitory computer usable medium having computer usable program code embodied therewith, said computer program code being readable by a computerized device and causing said computerized device to execute a method for performing radio frequency identification (RFID) authentication, said method comprising:
 receiving a request by a specific user for access to a specific asset, said specific user having a RFID device, said RFID device comprising:
  a first RFID tag comprising:
   a first integrated circuit device storing an encrypted identifier for said specific user, said encrypted identifier encrypted with a public key; and
   a first RFID tag antenna connected to said first integrated circuit device, said first RFID tag antenna transmitting said encrypted identifier, when activated; and
  a second RFID tag comprising:
   a second integrated circuit device storing a private key; and
   a second RFID tag antenna connected to said second integrated circuit device, said second RFID tag antenna transmitting said private key, when activated;
 determining a security level associated with said specific asset; and
 depending upon said security level, performing at least one level of user authentication using said RFID device.

18. The non-transitory computer usable medium of claim 17, said determining of said security level comprising accessing a first database listing security levels for specific assets.

19. The non-transitory computer usable medium of claim 17, said performing of said at least one level of user authentication comprising performing a first level of user authentication when said security level comprises one of a low security level, a medium security level and a high security level, said performing of said first level of user authentication comprising:
 causing a first RFID reader antenna of a RFID reader to activate said first RFID tag antenna in order to receive said encrypted identifier;
 accessing a second database storing said encrypted identifier for said specific user; and
 comparing said encrypted identifier as transmitted by said first RFID tag antenna with said encrypted identifier as stored in said second database.

20. The non-transitory computer usable medium of claim 19, said performing of said first level of user authentication further comprising one of the following:
 denying said specific user access to all of said assets when said encrypted identifier as stored by said second database and said encrypted identifier as transmitted by said first RFID tag antenna are not identical; and
 allowing said specific user access to said specific asset, when said encrypted identifier as stored by said second database and said encrypted identifier as transmitted by said first RFID tag antenna are identical and when said security level comprises a low security level.

21. The non-transitory computer usable medium of claim 19, said performing of said at least one level of user authentication further comprising performing a second level of user authentication when said security level comprises one of said medium security level and said high security level, said performing of said second level of user authentication comprising:
 causing a second RFID reader antenna of said RFID reader to activate said second RFID tag antenna in order to receive said private key;
 decrypting said encrypted identifier with said private key so as to generate a decrypted identifier for said specific user;
 accessing a third database storing an unencrypted identifier for said specific user; and
 comparing said decrypted identifier to said unencrypted identifier.

22. The non-transitory computer usable medium of claim 21, said performing of said second level of user authentication further comprising one of the following:

denying said specific user access to all of said assets, when said decrypted identifier and said unencrypted identifier are not identical; and allowing said specific user access to said specific asset, when said decrypted identifier and said unencrypted identifier are identical and when said security level comprises said medium security level.

23. The non-transitory computer usable medium of claim 21, said performing of said at least one level of user authentication further comprising performing a third level of user authentication when said security level comprises said high security level, said performing of said third level of user authentication comprising:

prompting said specific user to enter said unencrypted identifier through a user interface; and comparing said unencrypted identifier as entered through said user interface with said unencrypted identifier as stored in said third database.

24. The non-transitory computer usable medium of claim 23, said performing of said third level of user authentication further comprising one of the following:

denying said specific user access to all of said assets, when said unencrypted identifier as entered by said specific user through said user interface and said unencrypted identifier as stored by said third database are not identical; and allowing said specific user access to said specific asset, when said unencrypted identifier as entered by said specific user through said user interface and said unencrypted identifier as stored by said third database are identical.

* * * * *